United States Patent
Sun et al.

(10) Patent No.: US 11,309,936 B2
(45) Date of Patent: Apr. 19, 2022

(54) SIGNAL TRANSMISSION DEVICE

(71) Applicants: GLOBAL UNICHIP CORPORATION, Hsinchu (TW); TAIWAN SEMICONDUCTOR MANUFACTURING CO., LTD., Hsinchu (TW)

(72) Inventors: Yu-Cheng Sun, Hsinchu (TW); Sheng-Fan Yang, Hsinchu (TW); Yuan-Hung Lin, Hsinchu (TW); Yung-Yang Liang, Hsinchu (TW)

(73) Assignees: GLOBAL UNICHIP CORPORATION, Hsinchu (TW); TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 80 days.

(21) Appl. No.: 17/029,015

(22) Filed: Sep. 22, 2020

(65) Prior Publication Data
US 2021/0306028 A1  Sep. 30, 2021

(30) Foreign Application Priority Data
Mar. 26, 2020 (TW) .................................. 109110321

(51) Int. Cl.
*H04B 3/32* (2006.01)
*H04B 3/30* (2006.01)
*H04B 3/16* (2006.01)

(52) U.S. Cl.
CPC ............. *H04B 3/32* (2013.01); *H04B 3/16* (2013.01); *H04B 3/30* (2013.01)

(58) Field of Classification Search
CPC .............. H01R 13/646; H01R 13/6473; H01R 13/6461; H01R 13/6464; H01R 13/6466;
(Continued)

(56) References Cited

U.S. PATENT DOCUMENTS 10,084,618 B2 * 9/2018 Ishizaka .................. H04L 25/03
10,720,690 B2 * 7/2020 Shiue ...................... H01P 3/082
(Continued)

FOREIGN PATENT DOCUMENTS

TW          202009950 A       3/2020

OTHER PUBLICATIONS

Ryu et al., Analysis of Characteristics of Transmission Line with Two Reference Planes through High-Frequency Measurements, IEEE, 4 pages, 2005.*
(Continued)

*Primary Examiner* — Frank Duong
(74) *Attorney, Agent, or Firm* — CKC & Partners Co., LLC

(57) ABSTRACT

A signal transmission device includes a transmission line. The transmission line is configured to receive a signal transmitted from a transmission device, and output the signal to a receiving device. The transmission line includes a signal suppression device. The signal suppression device is coupled to the receiving device, and is configured to suppress a reflection signal reflected from the receiving device. The signal suppression device includes a pull-up element and a compensation element. The pull-up element is configured to decrease an equivalent impedance from the signal suppression device to the receiving device. The compensation element is configured to compensate for the equivalent impedance from the signal suppression device to the receiving device. A first terminal of the pull-up element is coupled to a first terminal of the compensation element, and a second terminal of the compensation element is coupled to the receiving device.

10 Claims, 4 Drawing Sheets

(58) Field of Classification Search
CPC ... H04B 3/16; H04B 3/20; H04B 3/21; H04B 3/23; H04B 3/237; H04B 3/30; H04B 3/32; H04B 3/464; H04J 3/10; H04J 1/12; H04L 5/1423; H04L 5/1407; H04L 5/16; H04L 25/0278; H04L 25/0292; H04L 25/0298; H04L 25/12; H04L 2210/25; H04L 2210/252; H04L 2210/254; H04Q 2011/0049

See application file for complete search history.

(56) References Cited

U.S. PATENT DOCUMENTS

| | | | | |
|---|---|---|---|---|
| 10,736,209 | B2* | 8/2020 | Yang | H01P 5/028 |
| 2005/0040846 | A1* | 2/2005 | Otsuka | H04L 25/08 |
| | | | | 326/31 |
| 2015/0288049 | A1* | 10/2015 | Song | H01P 5/028 |
| | | | | 29/846 |
| 2016/0127157 | A1* | 5/2016 | Wojnowski | H04L 25/085 |
| | | | | 375/257 |

OTHER PUBLICATIONS

Young et al., Package Design for High-Speed SerDes, downloadable at https://ieeexplore.ieee.org/document/5682990, 4 pages, 2010.*
Fadeyi et al., A Review of The Impact of Reflection of Transient Signals on TEM Transmission Lines, IEEE, 8 pages, 2018.*

* cited by examiner

SIGNAL TRANSMISSION DEVICE

RELATED APPLICATIONS

This application claims priority to Taiwan Application Serial Number 109110321, filed Mar. 26, 2020, which is herein incorporated by reference.

BACKGROUND

Field of Present Disclosure

The present disclosure relates to a signal transmission device. More particularly, the present disclosure relates to a signal transmission device comprising a signal suppression device.

Description of Related Art

With the increasing complexity of the signal transmission devices, the influences of the signal transmission paths on the signals become more and more obvious. Therefore, the impedances on the signal transmission paths also become critical for the signals. For example, t when the impedance on the signal transmission path is more larger, the signal is affected by the impedance more. As a result, signal distortion occurs after the signal is transmitted through the signal transmission path.

For the foregoing reasons, how to improve the signal distortion or influence of the impedance on the signal transmission path is an important issue, and the person skilled in the art are eager to reach.

SUMMARY

A signal transmission device is provided. The signal transmission device comprises a transmission line. The transmission line is configured to receive a signal transmitted from a transmission device, and output the signal to a receiving device. The transmission line comprises a signal suppression device. The signal suppression device is coupled to the receiving device, and is configured to suppress a reflection signal reflected from the receiving device. The signal depression device comprises a pull-up element and a compensation element. The pull-up element is configured to decrease an equivalent impedance from the signal suppression device to the receiving device. The compensation element is configured to compensate for the equivalent impedance from the signal suppression device to the receiving device. A first terminal of the pull-up element is coupled to a first terminal of the compensation element, and a second terminal of the compensation element is coupled to the receiving device.

In summary, the signal transmission device according to some embodiments of the present disclosure can provide a more appropriate signal transmission path with matching impedances for measuring the signal, so that the reflection signal caused by impedance mismatch during measurement can be reduced to obtain a measured signal with less distortion.

It is to be understood that both the foregoing general description and the following detailed description are by examples, and are intended to provide further explanation of the present disclosure as claimed.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure. In the drawings.

DESCRIPTION OF THE EMBODIMENTS

Figure 1:
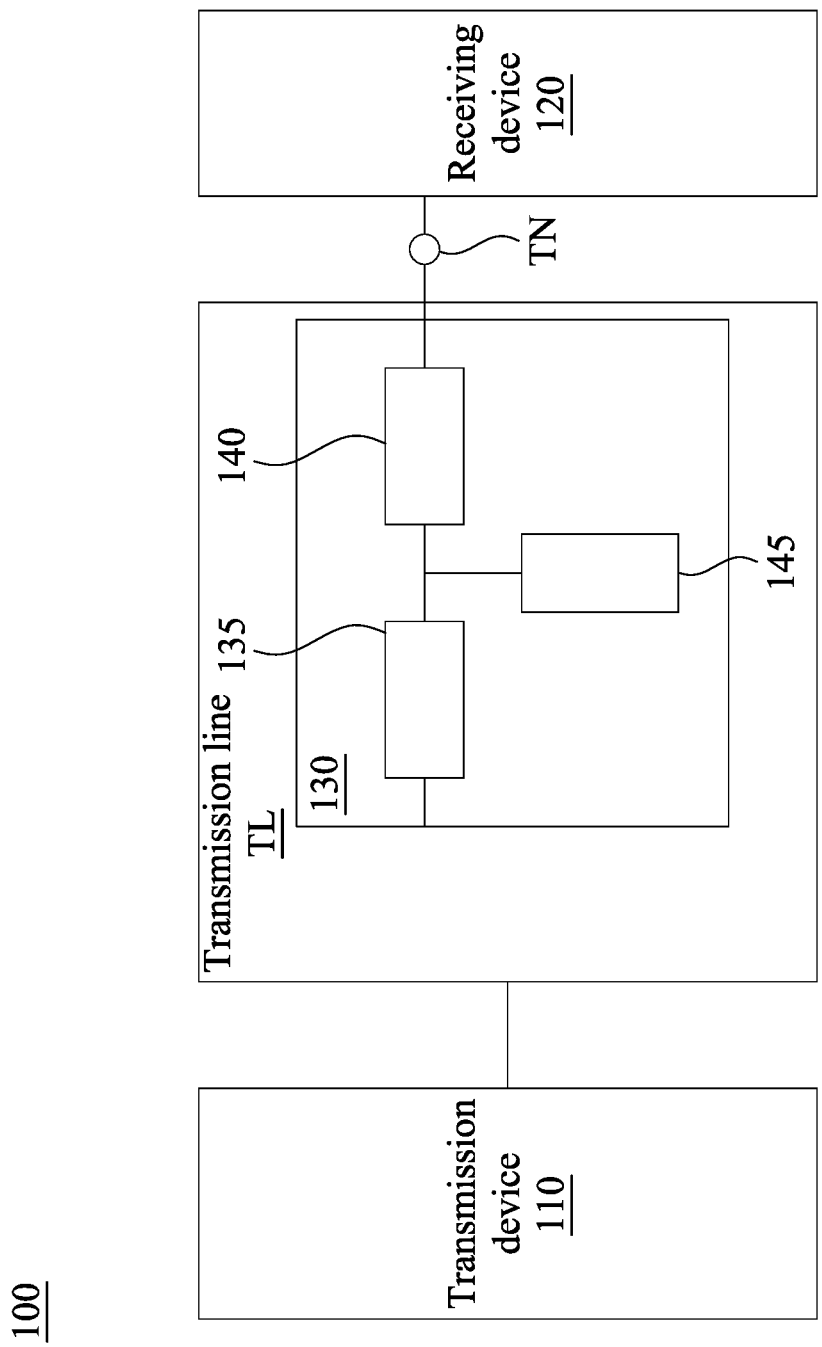
FIG. 1 depicts a schematic diagram of a communication system according to some embodiments of the present disclosure.

A description is provided with reference to FIG. 1. FIG. 1 depicts a schematic diagram of a communication system 100 according to some embodiments of the present disclosure. As shown in FIG. 1, the communication system 100 comprises a transmission device 110, a receiving device 120, and a transmission line TL. The transmission line TL is coupled between the transmission device 110 and the receiving device 120. However, the present disclosure is not limited in this regard. For example, the communication system 100 further comprises a connector (not shown in the figure) coupled between the transmission line TL and the transmission device 110. In some embodiments, the communication system 100 may be a SerDes or memory system, but the present disclosure is not limited in this regard.

In some embodiments, the transmission device 110 is configured to output a signal, and transmit the signal to the receiving device 120 through the transmission line TL. The receiving device 120 is configured to receive the signal transmitted through the transmission line TL. In some embodiments, the signal may be an analog signal or a digital signal.

In some embodiments, the transmission line TL comprises a signal suppression device 130. The signal suppression device 130 is coupled to the receiving device 120, and is configured to suppress a reflection signal reflected from the receiving device 120. As shown in FIG. 1, the signal suppression device 130 comprises a sub-transmission line 135, a compensation element 140, and a pull-up element 145. A first terminal of the sub-transmission line 135 is coupled to the transmission device 110. A second terminal of the sub-transmission line 135 is coupled to a first terminal of the compensation element 140 and a first terminal of the pull-up element 145. A second terminal of the compensation element 140 is coupled to the receiving device 120 through a node TN.

In some embodiments, the first terminal of the sub-transmission line 135 is directly coupled to the transmission device 110, which has an impedance value of about 45 to 60 ohms.

In some embodiments, the pull-up element 145 is configured to decrease an equivalent impedance from the signal suppression device 130 to the receiving device 120. In some embodiments, a second terminal of the pull-up element 145 is open (or called open-circuited stub). In some embodiments, the pull-up element 145 has an impedance value of about 20 to 30 ohms. In some embodiments, the pull-up element 145 has a length of about 6 to 10 millimeters (mms).

In some embodiments, the compensation element 140 is configured to compensate for the equivalent impedance from the signal suppression device 130 to the receiving device 120. In some embodiments, the compensation element 140 is configured to increase the equivalent impedance from the signal suppression device 130 to the receiving device 120. In some embodiments, the compensation element 140 has an impedance value of about 70 ohms. In some embodiments, the compensation element 140 has a length of about 7 to 13 mms.

In some embodiments, a signal in the communication system 100 can be obtained through measuring the node TN. For example, a probe is used to measure the signal transmitted to the receiving device 120 at the node TN.

In some embodiments, the receiving device 120 is a logic NAND gate, which has a low impedance value of about 30 ohms. In some embodiments, when an impedance of the transmission line TL is higher than an impedance of the receiving device 120, the signal is reflected after being transmitted to the receiving device 120 because the transmission line TL has a higher impedance value, and the reflected signal is inverse to the signal transmitted into the receiving device 120. The signal transmitted into the receiving device 120 and the reflected signal are superimposed at the node TN. Since the signal transmitted into the receiving device 120 and the reflected signal are superimposed at the node TN, part of the two signals of opposite phases cancel each other out. As a result, when the probe measures at the node TN, a signal smaller than the expected signal transmitted into the receiving device 120 is obtained, so that the signal actually received by the receiving device 120 is distorted. In the following, the embodiment shown in FIG. 2 is used to illustrate how to resolve the above signal distortion problem.

Figure 2:
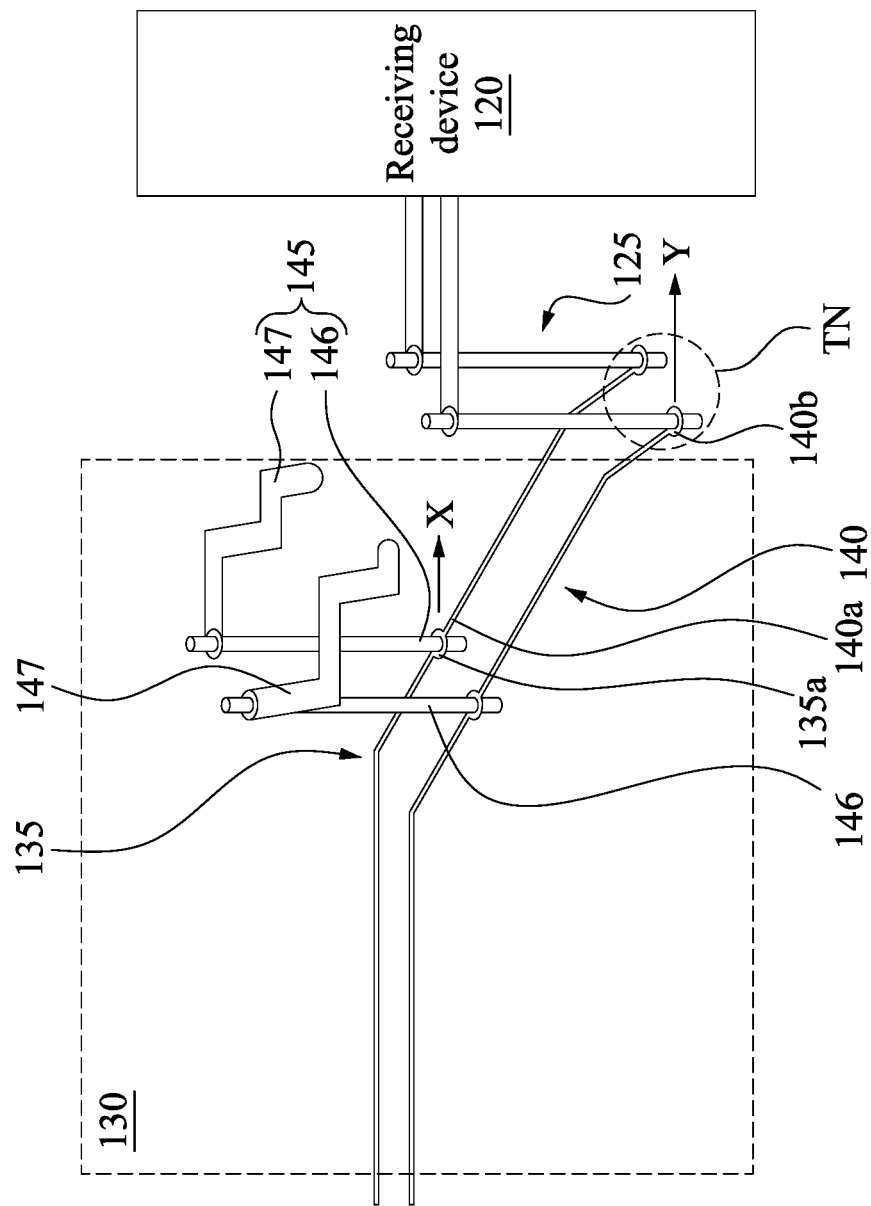
FIG. 2 depicts a schematic diagram of part of a communication system according to some embodiments of the present disclosure.

A description is provided with reference to FIG. 2. FIG. 2 depicts a schematic diagram of part of the communication system 100 according to some other embodiments of the present disclosure. The signal suppression device 130 and the receiving device 120 are depicted in FIG. 2.

As shown in FIG. 2, the signal suppression device 130 comprises the sub-transmission line 135, the compensation element 140, and the pull-up element 145. The pull-up element 145 comprises a via 146 and a capacitor element 147. A second terminal 135a of the sub-transmission line 135 is coupled to the via 146 and a first terminal 140a of the compensation element 140, and the via 146 is coupled to a first terminal of the capacitor element 147.

In some embodiments, the transmission line TL is disposed on a printed circuit board, and the printed circuit board comprises multiple layers for disposing circuit elements. In some embodiments, the sub-transmission line 135 is disposed on a first layer of the printed circuit board, the capacitor element 147 is disposed on a second layer of the printed circuit board, the compensation element 140 is disposed on the first layer of the printed circuit board, and the via 146 is formed on the first layer, on the second layer, and between the first layer and the second layer of the printed circuit board. In some embodiments, the first layer is different from the second layer. In other words, the via 146 couples the sub-transmission line 135 and the capacitor element 147 between the first layer and the second layer of the printed circuit board. In some embodiments, the first layer of the printed circuit board is a bottom layer of the printed circuit board.

In some embodiments, the capacitor element 147 is a parallel plate capacitor. However, the above form of capacitor is given for illustrative purposes. Any capacitor or capacitive element that can be applied to this area is within the contemplated scope of the present disclosure.

In some embodiments, the transmission line TL further comprises a via 125. The via 125 is coupled between the node TN and the receiving device 120.

In some embodiments, when the signal is transmitted to the second terminal 135a of the sub-transmission line 135, an equivalent circuit of the communication system 100 viewed from the second terminal 135a of the sub-transmission line 135 to the receiving device 120 (as indicated by the arrow X shown in FIG. 2) is considered. Since the via 146 and the capacitor element 147 in the pull-up element 145 can reduce an impedance value of the signal suppression device 130, an impedance value of the second terminal 135a of the sub-transmission line 135 is lower than an impedance value of the sub-transmission line 135 itself. Because the second terminal 135a of the sub-transmission line 135 has a lower equivalent impedance value, a reflected signal will be generated at the second terminal 135a of the sub-transmission line 135 and transmitted back to the sub-transmission line 135. However, the signal is still transmitted to compensation element 140 through the second terminal 135a of the sub-transmission line 135. In addition, an equivalent circuit of the communication system 100 viewed from a second terminal 140b of the compensation element 140 to the receiving device 120 (as indicated by the arrow Y shown in FIG. 2) is considered. Since the via 146 and the capacitor element 147 in the pull-up element 145 reduces the impedance value of the signal suppression device 130, an impedance value of the second terminal 140b of the compensation element 140 is higher than an impedance value of the first terminal 140a of the compensation element 140. In other words, the impedance value viewed from the second terminal 140b of the compensation element 140 to the receiving device 120 (as indicated by the arrow Y shown in FIG. 2) is relatively increased. Because the second terminal 140b of the compensation element 140 corresponds to the node TN, an impedance value of the node TN can thus be regarded as being relatively increased (for example, based on an impedance value setting of the compensation element 140, the impedance value of the node TN can be increased to match an impedance value of the transmission line TL). As a result, the above situation that the obvious reflection signal is generated at the node TN can be avoided (that is, the reflection of the signal transmitted to the receiving device 120 becomes less), and distortion of the measured signal (or the signal actually received by the receiving device 120) can be avoided when using the probe to measure the node TN.

In summary, the signal suppression device 130 shown in FIG. 1 and FIG. 2 according to some embodiments is mainly used for reflecting the transmitted signal before the node TN, so that the reflection caused by the impedance mismatch occurs before the node TN. Once there is no signal reflection at the node TN, the signal measured at the node TN will be the signal that is expected to be transmitted or close to the signal that is expected to be transmitted. As compared with the prior art in which no signal suppression device 130 is used, the distortion of the signal actually received by the receiving device 120 can be effectively avoided through adopting the signal suppression device 130 according to the embodiments of the present disclosure.

Figure 3A:
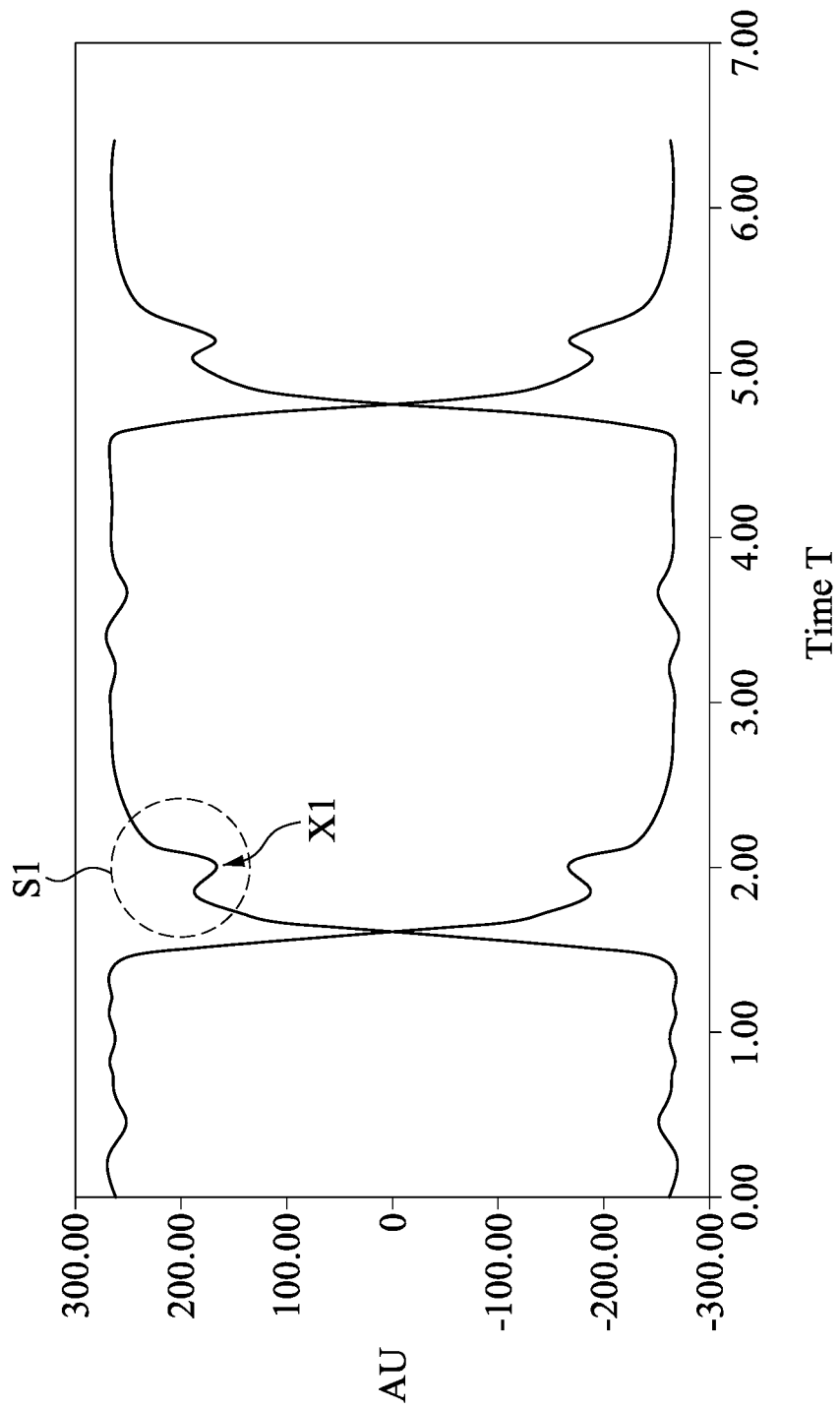
FIG. 3a depicts a simulated eye diagram of a measured signal according to some embodiments.
Figure 3B:
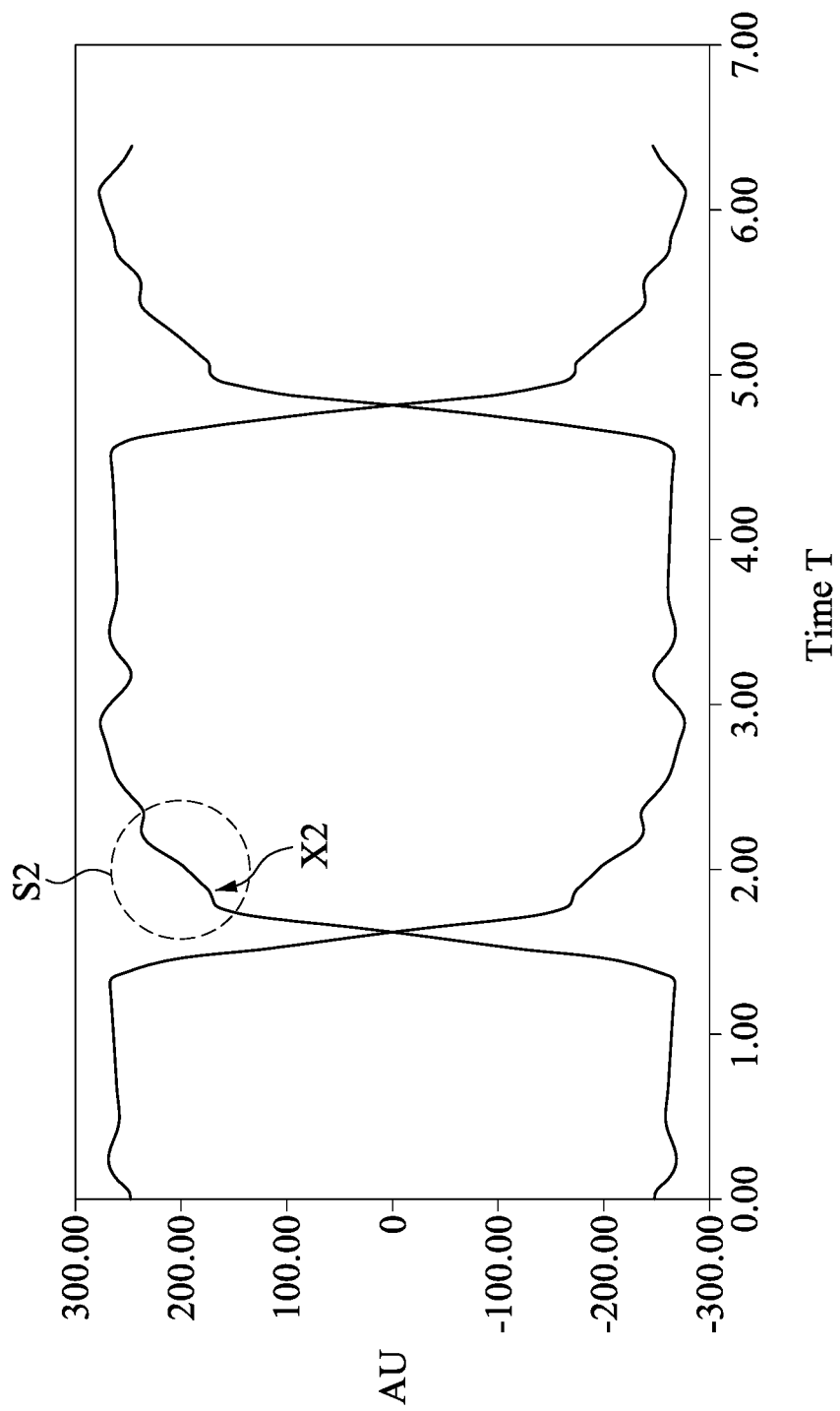
FIG. 3b depicts a simulated eye diagram of a measured signal according to some embodiments of the present disclosure.

A description is provided with reference to FIG. 3a and FIG. 3b. FIG. 3a and FIG. 3b depict simulated eye diagrams of measured signals according to the some embodiments of the present disclosure. In FIG. 3a and FIG. 3b, the abscissa of the simulated eye diagrams is time T and the ordinate is the signal strength unit AU. In some embodiments, the signal intensity unit AU is millivolt (mV) and the unit of time T is nanosecond (ns) in FIG. 3a and FIG. 3b. FIG. 3a shows the simulated eye diagram of the signal measured at the node TN without the signal suppression device 130 in the communication system 100, and FIG. 3b shows the simulated eye diagram of the signal measured at the node TN with the signal suppression device 130 being used in the communication system 100.

In FIG. 3a, the simulated eye diagram comprises an area S1. In FIG. 3b, the simulated eye diagram comprises an area S2. In some embodiments, the area S1 shows that the measured signal has a pull-down curve X1, and the area S2 shows that the measured signal has a pull-down curve X2 in the simulated eye diagrams. As shown in FIG. 3a and FIG. 3b, the extent to which the curve X2 in the area S2 is pulled down is lesser than the extent to which the curve X1 in the area S1 is pulled down. It is thus understood that a smoother transmission signal can be measured at the node TN when the signal suppression device 130 is used in the communication system 100.

In some embodiments, the pulling down of the curve X1 in the area S1 and the curve X2 in the area S2 is called a non-monotonic edge. In some embodiments, as compared with the simulated eye diagram in FIG. 3b, the simulated eye diagram in FIG. 3a has a larger non-monotonic edge.

In some other embodiments, an simulated eye diagram similar to that in FIG. 3b can be measured at the node TN when the sub-transmission line 135 has the impedance value of 50 ohms, the pull-up unit 145 has the impedance value of 20 ohms and the length of 8 mms, and the compensation element 140 has the impedance value of 70 ohms and the length of 10 mms.

In summary, the transmitted signal can be reflected before the node TN (or before the receiving device 120 receives the signal) through the signal suppression device 130 according to the present disclosure, so that the reflection caused by impedance mismatch occurs in advance. Once there is no signal reflection at the node TN (or where the receiving device 120 receives the signal), the signal measured at the node TN will be the signal that is expected to be transmitted or close to the signal that is expected to be transmitted. As compared with the prior art in which no signal suppression device 130 is used, the distortion of the signal actually received by the receiving device 120 can be effectively avoided through adopting the signal suppression device 130 according to the embodiment of the present disclosure.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims and their equivalents.

What is claimed is:

1. A signal transmission device comprising:
    a transmission line configured to receive a signal transmitted from a transmission device, and output the signal to a receiving device;
    wherein the transmission line comprises a signal suppression device, the signal suppression device is coupled to the receiving device, and is configured to suppress a reflection signal reflected from the receiving device, wherein the signal depression device comprises:
        a pull-up element configured to decrease an equivalent impedance from the signal suppression device to the receiving device; and
        a compensation element configured to compensate for the equivalent impedance from the signal suppression device to the receiving device;
        wherein a first terminal of the pull-up element is coupled to a first terminal of the compensation element, and a second terminal of the compensation element is coupled to the receiving device.

2. The signal transmission device of claim 1, wherein the transmission line further comprises a sub-transmission line, a first terminal of the sub-transmission line is coupled to the transmission device, and a second terminal of the sub-transmission line is coupled to a first terminal of the compensation element,
    wherein the pull-up element comprises:
        a first via coupled to the second terminal of the sub-transmission line and the first terminal of the compensation element; and
        a capacitor element coupled to the second terminal of the sub-transmission line and the first terminal of the compensation element through the first via.

3. The signal transmission device of claim 2, wherein the transmission line is disposed on a printed circuit board, wherein the sub-transmission line and the compensation element are disposed on a first layer of the printed circuit board, the capacitor element is disposed on a second layer of the printed circuit board different from the first layer, and the first via is formed on the first layer, on the second layer, and between the first layer and the second layer.

4. The signal transmission device of claim 2, wherein the transmission line further comprises:
    a second via coupled between the second terminal of the sub-transmission line and the receiving device.

5. The signal transmission device of claim 2, wherein the capacitor element is a parallel plate capacitor, wherein the capacitor element has an impedance value of about 20 to 30 ohms.

6. The signal transmission device of claim 2, wherein the capacitor element has a length of about 6 to 10 mms.

7. The signal transmission device of claim 1, wherein the compensation element has an impedance value of about 70 ohms.

8. The signal transmission device of claim 1, wherein the compensation element has a length of about 7 to 13 mms.

9. The signal transmission device of claim 1, wherein the signal suppression device is further configured to pull up the signal transmitted to the receiving device.

10. The signal transmission device of claim 1, wherein the compensation element is configured to increase the equivalent impedance from the signal suppression device to the receiving device.

* * * * *